United States Patent
Kadam et al.

(10) Patent No.: US 10,933,837 B2
(45) Date of Patent: Mar. 2, 2021

(54) DRIVER AIRBAG WITH SUPPORT

(71) Applicant: Ford Global Technologies, LLC, Dearborn, MI (US)

(72) Inventors: Mangesh Kadam, Canton, MI (US); Srinivas Reddy Malapati, Novi, MI (US); Yuqin Zhao, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 16/401,928

(22) Filed: May 2, 2019

(65) Prior Publication Data
US 2020/0346610 A1  Nov. 5, 2020

(51) Int. Cl.
*B60R 21/2334* (2011.01)
*B60R 21/203* (2006.01)
*B60R 21/16* (2006.01)

(52) U.S. Cl.
CPC ........ *B60R 21/2334* (2013.01); *B60R 21/203* (2013.01); *B60R 2021/161* (2013.01)

(58) Field of Classification Search
CPC .............. B60R 21/2334; B60R 21/203; B60R 2021/161
See application file for complete search history.

(56) References Cited

U.S. PATENT DOCUMENTS

| | | | |
|---|---|---|---|
| 7,631,891 B2 | 12/2009 | Washino | |
| 8,079,615 B2 * | 12/2011 | Tanaka | B60R 21/203 |
| | | | 280/743.2 |
| 8,764,053 B1 * | 7/2014 | Dix | B60R 21/232 |
| | | | 280/730.1 |
| 9,561,774 B2 * | 2/2017 | Cheng | B60R 21/239 |
| 9,738,243 B2 * | 8/2017 | Fukawatase | B60R 21/2338 |
| 2005/0121889 A1 | 6/2005 | Enders et al. | |
| 2017/0136981 A1 * | 5/2017 | Fukawatase | B60R 21/2338 |
| 2020/0094767 A1 * | 3/2020 | Kadam | B60R 21/203 |

FOREIGN PATENT DOCUMENTS

| | | |
|---|---|---|
| EP | 3342649 A1 | 7/2008 |
| EP | 3415785 A1 | 12/2018 |
| JP | H11342819 A | 12/1999 |
| JP | 200762469 A | 3/2007 |
| JP | 2008179173 A | 8/2008 |
| JP | 2008201251 A * | 9/2008 |

* cited by examiner

*Primary Examiner* — Drew J Brown
(74) *Attorney, Agent, or Firm* — Frank A. MacKenzie; Bejin Bieneman PLC

(57) ABSTRACT

A restraint system includes a steering-wheel hub, a steering-wheel handle mounted to the steering-wheel hub and extending less than 360° around the steering-wheel hub, an airbag housing disposed in the steering-wheel hub, an airbag inflatable from an uninflated position in the airbag housing, and a plurality of rods hinged to the airbag housing and attached to the airbag.

21 Claims, 4 Drawing Sheets

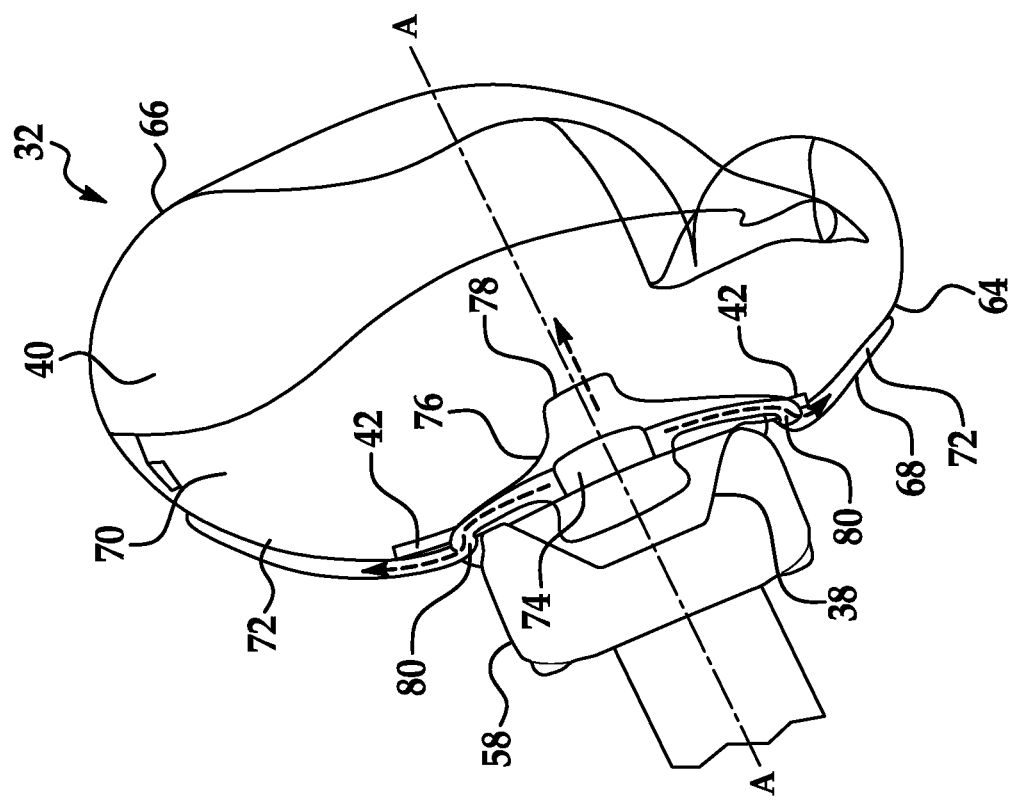
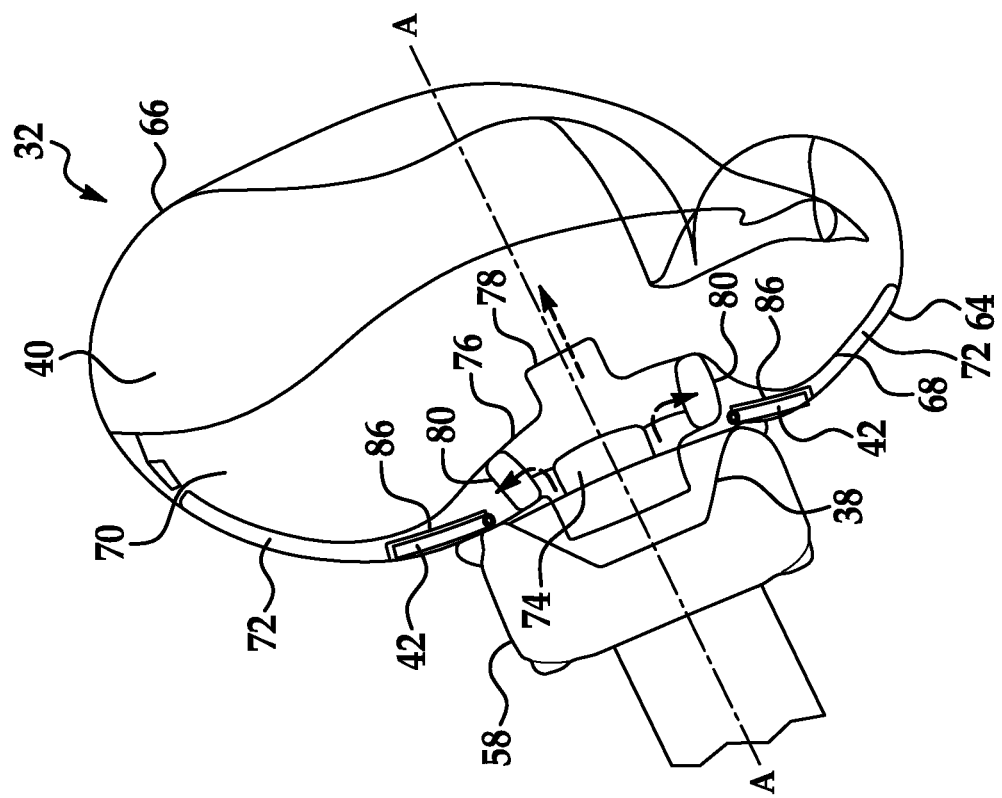
FIG. 3B
FIG. 3A

DRIVER AIRBAG WITH SUPPORT

BACKGROUND

Vehicles are equipped with airbags. In the event of an impact, an inflator activates and provides inflation medium to the airbags and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

BRIEF DESCRIPTION OF THE DRAWINGS

FIG. 3A is a side cross-sectional view of the steering wheel with a first example airbag in an inflated position and a first example inflator.

FIG. 3B is a side cross-sectional view of the steering wheel with a second example airbag in the inflated position and the first example inflator.

DETAILED DESCRIPTION

Figure 1:
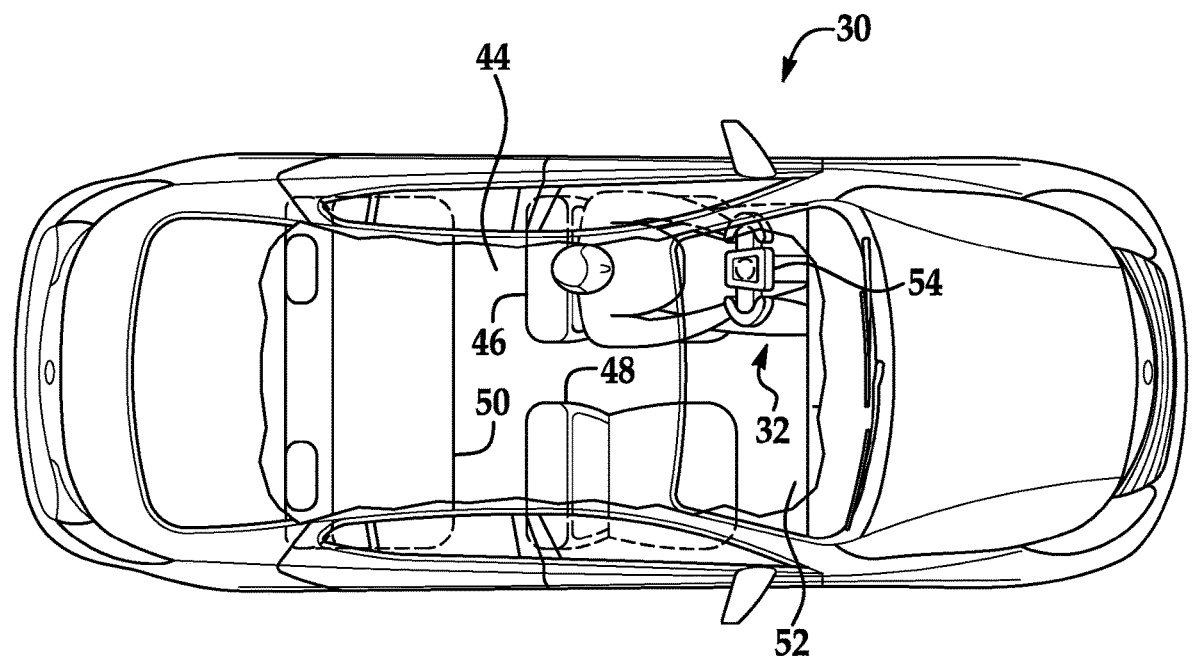
FIG. 1 is a top view of a vehicle with a passenger cabin exposed for illustration.

A restraint system includes a steering-wheel hub, a steering-wheel handle extending from the steering-wheel hub, an airbag housing disposed in the steering-wheel hub, an airbag inflatable from an uninflated position in the airbag housing, and a plurality of rods hinged to the airbag housing and attached to the airbag.

The airbag may be inflatable to an inflated position, the airbag may include a primary chamber and a plurality of secondary chambers, and the plurality of secondary chambers may extend from the steering-wheel hub when the airbag is in the inflated position. The steering-wheel hub may be rotatable and define an axis of rotation, and the secondary chambers may be elongated radially relative to the axis of rotation when the airbag is in the inflated position. Each rod may extend radially relative to the axis of rotation along one of the secondary chambers when the airbag is in the inflated position.

The restraint system may further include a plurality of strips each extending radially relative to the axis of rotation along one of the secondary chambers when the airbag is in the inflated position, and each strip may be a bistable spring having a first stable position in which the strip is coiled and a second stable position in which the strip is straight. The strips may be spaced radially relative to the axis of rotation from the steering-wheel hub when the airbag is in the inflated position.

The restraint system may further include an inflator fixed relative to the steering-wheel hub, and a deflector positioned to receive inflation medium from the inflator and direct the inflation medium to the primary chamber and secondary chambers. The deflector may be sized to pressurize the secondary chambers more than the primary chamber.

The restraint system may further include a two-stage inflator including a first charge and a second charge, the first charge may be configured to discharge before the second charge, the first charge may be configured to supply inflation medium to the secondary chambers, and the second charge may be configured to supply inflation medium to the primary chamber.

The steering-wheel handle may be a first steering-wheel handle, the steering-wheel hub may be rotatable and define an axis of rotation, the restraint system may further include a second steering-wheel handle mounted to the steering-wheel hub, and the first and second steering-wheel handles may each extend no more than 90° around the axis of rotation. The steering-wheel hub may be rotatable from a centered position, the first steering-wheel handle may be disposed laterally from the steering-wheel hub in the centered position, and the second steering-wheel handle may be disposed laterally in an opposite direction from the steering-wheel hub in the centered position.

The airbag may be inflatable to an inflated position, the steering-wheel hub may be rotatable and define an axis of rotation, the rods may be rotatable relative to the airbag housing between a first position extending radially inward relative to the axis of rotation when the airbag is in the uninflated position and a second position extending radially outward relative to the axis of rotation when the airbag is in the inflated position. The rods in the second position may rest against the steering-wheel hub.

The airbag may include a plurality of pockets, and each pocket may house one of the rods.

The restraint system may further include a plurality of strips attached to the airbag, and each strip may be a bistable spring having a first stable position in which the strip is coiled and a second stable position in which the strip is straight. The airbag may be inflatable to an inflated position, and each strip may be in the first stable position when the airbag is in the uninflated position and may be in the second stable position when the airbag is in the inflated position.

The steering-wheel hub may be rotatable and define an axis of rotation, and each strip may extend radially relative to the axis of rotation when the airbag is in the inflated position.

The strips may be spaced radially relative to the axis of rotation from the steering-wheel hub when the airbag is in the inflated position.

The airbag may include a plurality of pockets, and each pocket may house one of the strips.

The steering-wheel hub may be rotatable and define an axis of rotation, and the steering-wheel handle may extend less than 360° around the axis.

A restraint system 32 for a vehicle 30 includes a steering-wheel hub 34, a first steering-wheel handle 36 mounted to the steering-wheel hub 34 and extending less than 360° around the steering-wheel hub 34, an airbag housing 38 disposed in the steering-wheel hub 34, an airbag 40 inflatable from an uninflated position in the airbag housing 38, and a plurality of rods 42 hinged to the airbag housing 38 and attached to the airbag 40.

The rods 42 of the restraint system 32 can effectively provide a reaction surface for the airbag 40 when the first steering-wheel handle 36 of a steering wheel 54 is circumferentially incomplete (or when multiple steering-wheel handles 36, 56 are circumferentially incomplete), i.e., does not extend through a full circle around the steering-wheel hub 34. The steering wheel 54 being circumferentially incomplete can provide more compact packaging for the steering wheel 54, such as if the steering wheel 54 is retractable, as well as a better view of displays on an instrument panel 52 for an occupant. Secondary chambers 72 of the airbag 40 and strips 88 attached to the airbag 40, described below, can also help provide a reaction surface for the airbag 40.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 44 to house occupants, if any, of the vehicle 30. The passenger cabin 44 includes a driver seat 46 and a passenger seat 48 disposed at a front of the passenger cabin 44 and one or more back seats 50 disposed behind the driver and passenger seats 46, 48. The passenger cabin 44 may also include third-row seats (not shown) at a rear of the passenger cabin 44. In FIG. 1, the driver seat 46 and passenger seat 48 are shown to be bucket seats, and the back seats 50 are shown to be bench seats, but the seats 46, 48, 50 may be other types. The position and orientation of the seats 46, 48, 50 and components thereof may be adjustable by an occupant.

The instrument panel 52 may be disposed at a forward end of the passenger cabin 44 and face toward the driver seat 46 and passenger seat 48. The instrument panel 52 may provide mounting locations for vehicle controls, such as the steering wheel 54; gauges, dials, and information displays; heating and ventilation equipment; a radio and other electronics; etc.

Figure 2:
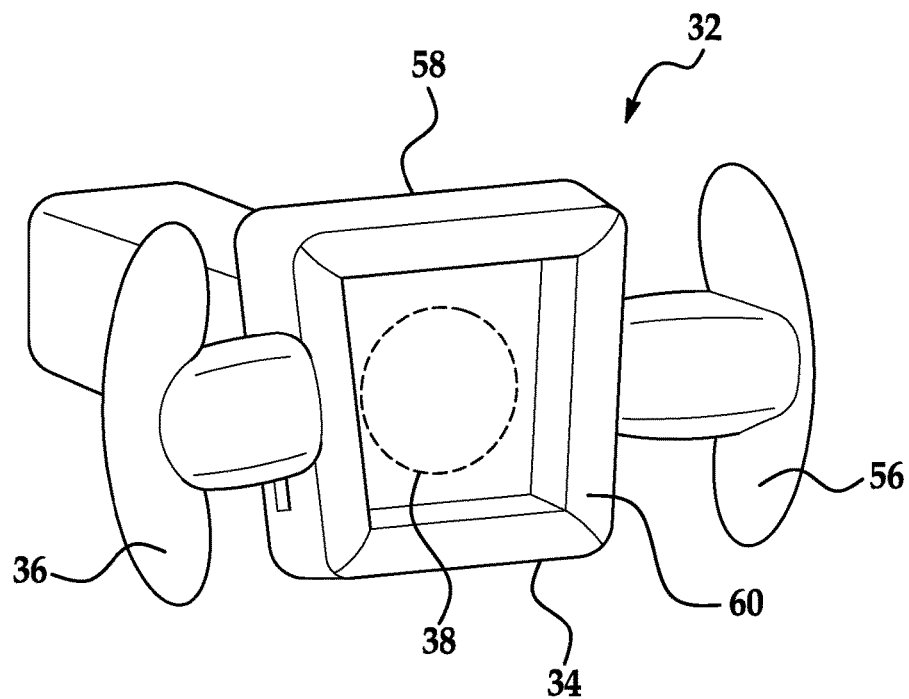
FIG. 2 is a rear perspective view of a steering wheel of the vehicle.

With reference to FIG. 2, the steering wheel 54 includes the steering-wheel hub 34, the first steering-wheel handle 36, and a second steering-wheel handle 56. The steering wheel 54 is rotatable relative to the instrument panel 52 and defines an axis A of rotation. The steering-wheel handles 36, 56 are fixed relative to the steering-wheel hub 34, and the steering wheel 54 rotates as a single unit relative to the instrument panel 52 around the axis A. An occupant can grasp the steering wheel 54 by the steering-wheel handles 36, 56 and rotate the steering wheel 54 to control a steering system (not shown) of the vehicle 30.

The steering-wheel hub 34 is rotatably mounted to the instrument panel 52. The steering-wheel hub 34 is rotatable relative to the instrument panel 52 and defines the axis A. The steering-wheel hub 34 is rotatable from a centered position, i.e., a position indicating straight-ahead travel for the vehicle 30, to left- and right-turning positions.

The steering-wheel hub 34 includes a steering-wheel-hub body 58 and a steering-wheel-hub cover 60. The steering-wheel-hub body 58 faces forward, i.e., toward the instrument panel 52, and the steering-wheel-hub cover 60 faces rearward, i.e., toward the driver seat 46. The steering-wheel-hub body 58 and steering-wheel-hub cover 60 enclose a space inside the steering-wheel hub 34. The steering-wheel-hub cover 60 is configured to split open or otherwise open when the airbag 40 inflates from inside the steering-wheel hub 34.

The steering-wheel handles 36, 56 are mounted to the steering-wheel hub 34; specifically, each steering-wheel handle 36, 56 is attached to and extends from the steering-wheel hub 34. The first steering-wheel handle 36 is disposed laterally, e.g., left, of the steering-wheel hub 34 in the centered position, and the second steering-wheel handle 56 is disposed laterally in an opposite direction, e.g., right, of the steering-wheel hub 34 in the centered position. The steering-wheel handles 36, 56 are positioned to be grasped by an occupant at 9 o'clock and 3 o'clock positions. The steering-wheel handles 36, 56 each extend partially circumferentially around the axis A, e.g., around the steering-wheel hub 34. The steering-wheel handles 36, 56 extend less than 360° around the axis A, more specifically, each no more than 90° around the axis A. The steering-wheel handles 36, 56 define a circumferential gap between each other above the axis A and below the axis A.

Figure 3C:
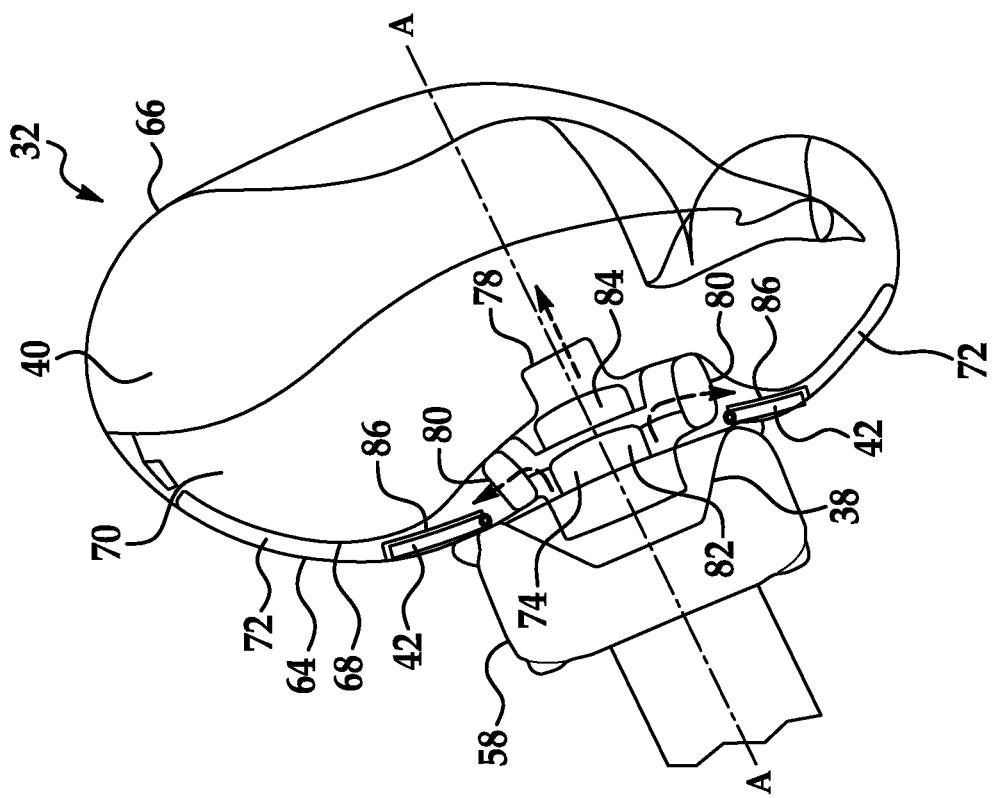
FIG. 3C is a side cross-sectional view of the steering wheel with the first example airbag in the inflated position and a second example inflator.

With reference to FIGS. 3A-C, the airbag housing 38 is disposed in the steering-wheel hub 34, e.g., in the space enclosed by the steering-wheel-hub body 58 and steering-wheel-hub cover 60. The airbag housing 38 is fixed relative to the steering-wheel hub 34. The airbag housing 38 partially encloses the airbag 40 in the uninflated position.

Figure 5:
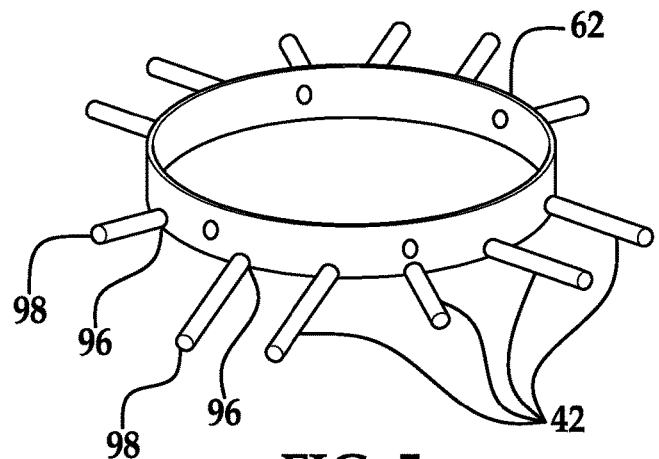
FIG. 5 is a perspective view of a ring of an airbag housing with rods.

With reference to FIG. 5, the airbag housing 38 includes a ring 62. The ring 62 defines an axis extending in a longitudinal direction relative to the vehicle 30, and which may be coextensive or parallel to the axis A.

Returning to FIGS. 3A-C, the airbag 40 is inflatable from the uninflated position to an inflated position. The airbag 40 in the uninflated position is disposed at least partially in the airbag housing 38. The airbag 40 in the uninflated position is disposed in the space enclosed by the steering-wheel-hub body 58 and steering-wheel-hub cover 60 and is concealed by the steering-wheel-hub cover 60. The airbag 40 pushes open or pushes aside the steering-wheel-hub cover 60 while inflating from the uninflated position to the inflated position. The airbag 40 in the inflated position extends rearward from the steering-wheel hub 34.

The airbag 40 includes a front panel 64, a rear panel 66, and a secondary-chamber panel 68. When the airbag 40 is in the inflated position, the front panel 64 faces forward relative to the vehicle 30, and the rear panel 66 faces rearward relative to the vehicle 30. When the airbag 40 is in the inflated position, the front panel 64 extends from the steering-wheel hub 34 to the rear panel 66, and the rear panel 66 provides a contact surface for an occupant of the driver seat 46 during a frontal impact to the vehicle 30. The secondary-chamber panel 68 is attached to the front panel 64 and extends along either the inside (rearward-facing side) of the front panel 64, as shown in FIGS. 3A and 3C, or the outside (forward-facing side) of the front panel 64, as shown in FIG. 3B. The panels 64, 66, 68 may or may not correspond to sections of fabric that have been stitched together to constitute the airbag 40.

The airbag 40 may be formed of any suitable airbag material, for example, a woven polymer. For example, the airbag 40 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 40 includes a primary chamber 70 and a plurality of secondary chambers 72. The primary chamber 70 is fluidly isolated from the secondary chambers 72. For the purposes of this disclosure, "fluidly isolated" is defined as lacking a path for fluid to flow during normal operation. The secondary chambers 72 may be fluidly isolated from each other or fluidly connected to each other.

When the airbag 40 is in the inflated position, the primary chamber 70 is farther rearward than the secondary chambers 72 and is positioned to cushion an occupant sitting in the driver seat 46 during a frontal impact to the vehicle 30. The rear panel 66 partially constitutes the primary chamber 70. If the secondary-chamber panel 68 extends along the inside of the front panel 64, then the secondary-chamber panel 68 and the portion of the front panel 64 not covered by the secondary-chamber panel 68 constitute the primary chamber 70 along with the rear panel 66. If the secondary-chamber panel 68 extends along the outside of the front panel 64, then the front panel 64 constitutes the primary chamber 70 along with the rear panel 66.

Figure 4:
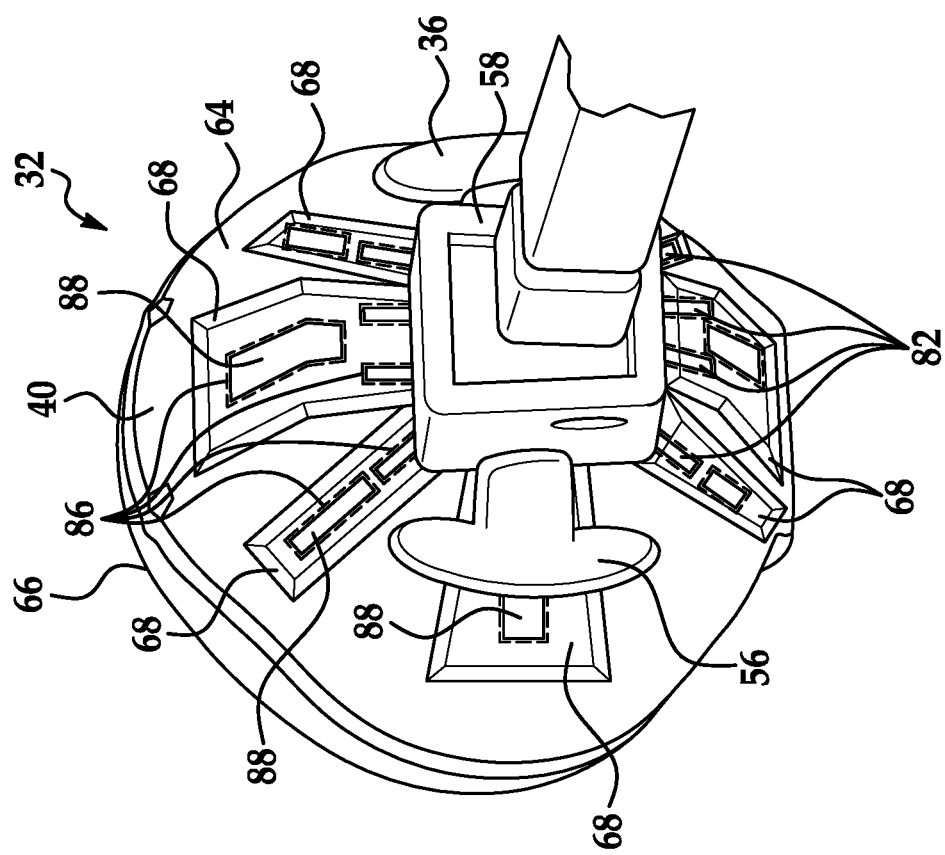
FIG. 4 is a front perspective view of the steering wheel with the airbag in the inflated position.

With reference to FIG. 4, when the airbag 40 is in the inflated position, the secondary chambers 72 extend from the steering-wheel hub 34; specifically, the secondary chambers 72 are elongated radially relative to the axis A and extend along the rear panel 66. The secondary chambers 72 extend between the primary chamber 70 and the steering wheel 54, e.g., the steering-wheel hub 34 and/or the steering-wheel handles 36, 56. The secondary-chamber panel 68 and the portion of the front panel 64 covered by the secondary-chamber panel constitute the secondary chambers 72.

Returning to FIGS. 3A-C, an inflator 74 is fluidly connected to the airbag 40, e.g., to the primary chamber 70 and to the secondary chambers 72. Upon receiving a signal from, e.g., a controller 90, the inflator 74 inflates the airbag 40 with an inflation medium, such as a gas. The inflator 74 may be, for example, a pyrotechnic inflator that uses a chemical reaction to drive inflation medium to the airbag 40. The inflator 74 may be of any suitable type, for example, a cold-gas inflator.

The inflator 74 is fixed relative to the steering-wheel hub 34. The inflator 74 is mounted to the airbag housing 38 and is disposed in the space enclosed by the steering-wheel-hub body 58 and steering-wheel-hub cover 60.

With reference to FIGS. 3A-B, the restraint system 32 may include a deflector 76. The deflector 76 may be positioned to receive inflation medium from the inflator 74 and direct the inflation medium to the primary chamber 70 and secondary chambers 72. The deflector 76 includes a first outlet 78 connected to the primary chamber 70 and one or more second outlets 80 connected to the secondary chambers 72. The deflector 76 is sized to pressurize the secondary chambers 72 more than the primary chamber 70; i.e., the ratio of inflation medium directed to the secondary chambers 72 versus inflation medium directed to the primary chamber 70 is greater than the ratio of a maximum volume (i.e., fully inflated volume) of the secondary chambers 72 versus a maximum volume of the primary chamber 70, i.e., $$\frac{\dot{m}_2}{\dot{m}_1} > \frac{V_2}{V_1}$$

in which $\dot{m}_1$ is a mass flow rate of inflation medium passing to the primary chamber 70, $\dot{m}_2$ is a mass flow rate of inflation medium passing to the secondary chambers 72, $V_1$ is a maximum volume of the primary chamber 70, and $V_2$ is a maximum volume of the secondary chambers 72. The ratio of mass flow rates to the primary chamber 70 and secondary chambers 72 can depend on the cross-sectional areas of the first outlet 78 and the second outlets 80, e.g., $$\frac{\dot{m}_2}{\dot{m}_1} = \frac{A_2}{A_1}$$

in which $A_1$ is the cross-sectional area of the first outlet 78 and $A_2$ is the total cross-sectional area of the second outlets 80. The inflator 74 and the deflector 76 thus inflate the secondary chambers 72 to be stiffer than the primary chamber 70.

With reference to FIG. 3C, alternatively or additionally to the restraint system 32 including the deflector 76, the inflator 74 can be a two-stage inflator including a first charge 82 and a second charge 84. The first charge 82 is configured to discharge before the second charge 84 and supply inflation medium to the secondary chambers 72; e.g., the first charge 82 outlets to the secondary chambers 72. The second charge 84 is configured to discharge after the first charge 82 and supply inflation medium to the primary chamber 70; e.g., the second charge 84 outlets to the primary chamber 70. The inflator 74 thus inflates the secondary chambers 72 before inflating the primary chamber 70.

With reference to FIG. 4, the rods 42 are attached to the airbag 40, e.g., to the front panel 64. The airbag 40 includes a plurality of pockets 86. Each pocket 86 can be stitched onto the airbag 40, e.g., onto the rear panel 66. At least some of the pockets 86 house the rods 42; each pocket 86 that houses the rods 42 houses one rod 42. The pockets 86 housing rods 42 are sized to receive the rods 42, e.g., sized to receive one rod 42 and no other components. Each rod 42 is housed in one of the pockets 86.

With reference to FIG. 5, the rods 42 are hinged to the airbag housing 38, specifically to the ring 62. The rods 42 are each elongated from a hinged end 96 to a free end 98. The free ends 98 are contained within the pockets 86, and the hinged ends 96 extend out of the pockets 86. The rods 42 can have any suitable cross-sectional shape, e.g., cylindrical, rectangular, etc. The rods 42 are rigid relative to the airbag 40 and are made of any suitably stiff material, e.g., a metal such as steel or aluminum.

The rods 42 are rotatable relative to the airbag housing 38, e.g., relative to the ring 62. Each rod 42 is rotatable relative to the ring 62 around an axis that is tangential to the ring 62; i.e., as each rod 42 rotates, the rod 42 points radially inward, axially, or radially outward relative to the ring 62.

The rods 42 are rotatable relative to the airbag housing 38 between a first position and a second position. The rods 42 are in the first position when the airbag 40 is in the uninflated position. The rods 42 in the first position extend radially inward relative to the axis A. The rods 42 are in the second position when the airbag 40 is in the inflated position. The rods 42 in the second position extend radially outward relative to the axis A and rest against the steering-wheel hub 34, as shown in FIGS. 3A-C. The rods 42 in the second position are elongated from inside the steering-wheel hub 34 to outside the steering-wheel hub 34. When the rods 42 rotate from the first position to the second position, the steering-wheel hub 34 blocks the rods 42 from rotating past the second position.

Figure 6:
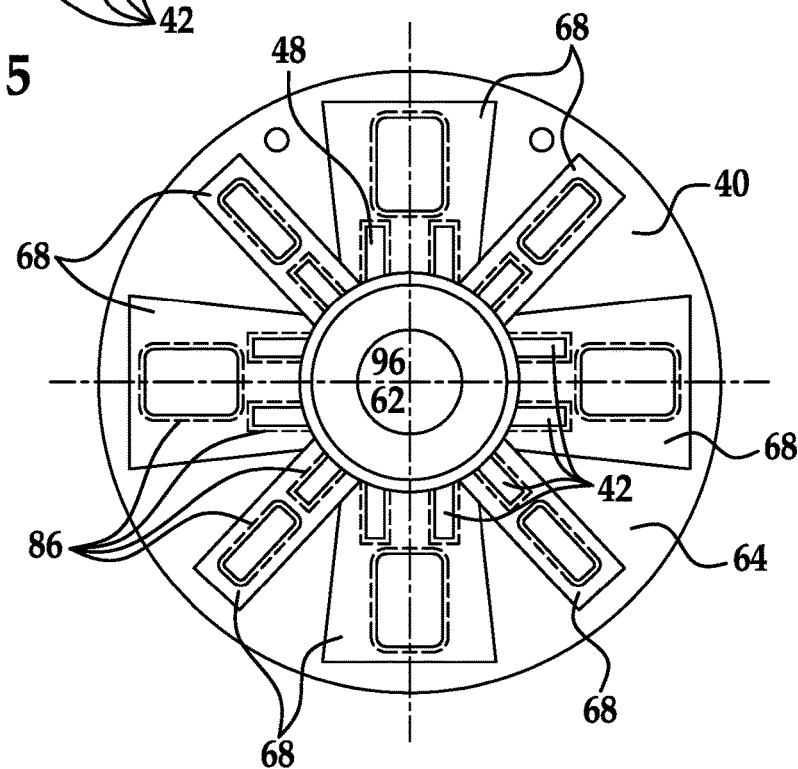
FIG. 6 is a front plan view of the airbag.

With reference to FIGS. 4 and 6, the plurality of strips 88 are attached to the airbag 40. The airbag 40 includes the pockets 86, and at least some of the pockets 86 house the strips 88. Each pocket 86 that houses the strips 88 houses one strip 88. The pockets 86 housing strips 88 are sized to receive the strips 88, e.g., sized to each receive one strip 88 and no other components. Each strip 88 is housed in one of the pockets 86. Each pocket 86 housing one of the strips 88 encloses the strip 88, e.g., is stitched entirely around the strip 88.

Each strip 88 is a bistable spring having a first stable position in which the strip 88 is coiled and a second stable position in which the strip 88 is straight. For example, each strip 88 can have a slightly curved cross-section that is elongated along a length of the strip 88. When the strip 88 moves between the first position and the second position, outer edges along the length are in greater tension than a middle along the length, causing the strip 88 to continue transitioning until the strip 88 is fully in either the first position or the second position. The strip 88 may be formed of any sufficiently stiff and ductile material, e.g., stainless steel.

Each strip 88 is in the first stable position when the airbag 40 is in the uninflated position and is in the second stable position when the airbag 40 is in the inflated position. The force of inflation of the airbag 40 causes the strips 88 to transition, i.e., uncoil, from the first stable position to the second stable position.

When the airbag 40 is in the inflated position, each of the strips 88 extends radially relative to the axis A along one of the secondary chambers 72. When the airbag 40 is in the inflated position, the pockets 86 housing the strips 88 and the strips 88 housed therein are spaced radially relative to the axis A from the steering-wheel hub 34. Each strip 88 is farther radially from the axis A than an outer end of any rods 42 extending along the same secondary chamber 72 as the strip 88.

Figure 7:
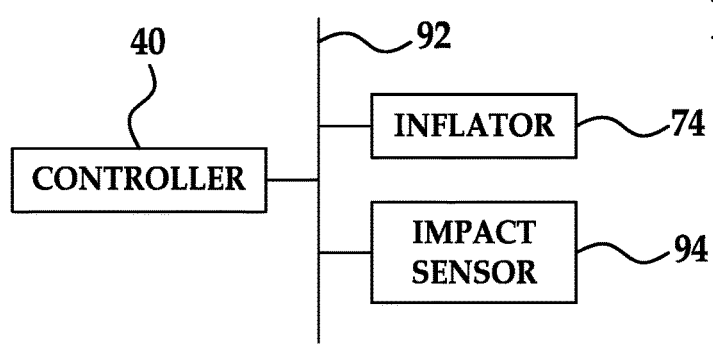
FIG. 7 is a block diagram of a control system for the airbag.

With reference to FIG. 7, the controller 90 is a microprocessor-based controller. The controller 90 includes a processor, a memory, etc. The memory of the controller 90 includes media for storing instructions executable by the processor as well as for electronically storing data and/or databases. The controller 90 can be, e.g., a restraint control module.

The controller 90 may transmit and receive data through a communications network 92 such as a controller area network (CAN) bus, Ethernet, WiFi, Local Interconnect Network (LIN), onboard diagnostics connector (OBD-II), and/or by any other wired or wireless communications network. The controller 90 may be communicatively coupled to the inflator 74, an impact sensor 94, and other components via the communications network 92.

The impact sensor 94 is adapted to detect an impact to the vehicle 30. The impact sensor 94 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 94 may be located at numerous points in or on the vehicle 30.

In the event of an impact, the impact sensor 94 can detect the impact and transmit a signal through the communications network 92 to the controller 90. The controller 90 can transmit a signal through the communications network 92 to the inflator 74. The inflator 74 can discharge and inflate the airbag 40. Because the deflector 76 is present or because the inflator 74 is two-stage, the secondary chambers 72 inflate before the primary chamber 70 and/or more forcefully than the primary chamber 70. The inflation of the secondary chambers 72 moves the rods 42 from the first position to the second position and uncoils the strips 88 from the first stable position to the second stable position. The primary chamber 70 can provide cushioning for an occupant sitting in the driver seat 46. The secondary chambers 72, the rods 42, and/or the strips 88 can provide a reaction surface for the primary chamber 70.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a steering-wheel hub;
   a steering-wheel handle extending from the steering-wheel hub;
   an airbag housing disposed in the steering-wheel hub;
   an airbag inflatable from an uninflated position in the airbag housing; and
   a plurality of rods hinged to the airbag housing and attached to the airbag;
   wherein the airbag is inflatable to an inflated position;
   the steering-wheel hub is rotatable and defines an axis of rotation;
   the rods are rotatable relative to the airbag housing between a first position extending radially inward relative to the axis of rotation when the airbag is in the uninflated position and a second position extending radially outward relative to the axis of rotation when the airbag is in the inflated position; and
   the rods in the second position rest against the steering-wheel hub.

2. The restraint system of claim 1, wherein the airbag includes a primary chamber and a plurality of secondary chambers, and the plurality of secondary chambers extend from the steering-wheel hub when the airbag is in the inflated position.

3. The restraint system of claim 2, wherein the secondary chambers are elongated radially relative to the axis of rotation when the airbag is in the inflated position.

4. The restraint system of claim 3, wherein each rod extends radially relative to the axis of rotation along one of the secondary chambers when the airbag is in the inflated position.

5. The restraint system of claim 3, further comprising a plurality of strips each extending radially relative to the axis of rotation along one of the secondary chambers when the airbag is in the inflated position, wherein each strip is a bistable spring having a first stable position in which the strip is coiled and a second stable position in which the strip is straight.

6. The restraint system of claim 5, wherein the strips are spaced radially relative to the axis of rotation from the steering-wheel hub when the airbag is in the inflated position.

7. The restraint system of claim 2, further comprising an inflator fixed relative to the steering-wheel hub, and a deflector positioned to receive inflation medium from the inflator and direct the inflation medium to the primary chamber and secondary chambers.

8. The restraint system of claim 7, wherein the deflector is sized to pressurize the secondary chambers more than the primary chamber.

9. The restraint system of claim 2, further comprising a two-stage inflator including a first charge and a second charge, wherein the first charge is configured to discharge before the second charge, the first charge is configured to supply inflation medium to the secondary chambers, and the second charge is configured to supply inflation medium to the primary chamber.

10. The restraint system of claim 1, wherein the steering-wheel handle is a first steering-wheel handle, the restraint system further comprises a second steering-wheel handle mounted to the steering-wheel hub, and the first and second steering-wheel handles each extend no more than 90° around the axis of rotation.

11. The restraint system of claim 10, wherein the steering-wheel hub is rotatable from a centered position, the first steering-wheel handle is disposed laterally from the steering-wheel hub in the centered position, and the second steering-wheel handle is disposed laterally in an opposite direction from the steering-wheel hub in the centered position.

12. The restraint system of claim 1, wherein the airbag includes a plurality of pockets, and each pocket houses one of the rods.

13. The restraint system of claim 1, further comprising a plurality of strips attached to the airbag, wherein each strip is a bistable spring having a first stable position in which the strip is coiled and a second stable position in which the strip is straight.

14. The restraint system of claim 13, wherein each strip is in the first stable position when the airbag is in the uninflated position and is in the second stable position when the airbag is in the inflated position.

15. The restraint system of claim 13, wherein each strip extends radially relative to the axis of rotation when the airbag is in the inflated position.

16. The restraint system of claim 13, wherein the strips are spaced radially relative to the axis of rotation from the steering-wheel hub when the airbag is in the inflated position.

17. The restraint system of claim 13, wherein the airbag includes a plurality of pockets, and each pocket houses one of the strips.

18. The restraint system of claim 1, wherein the steering-wheel handle extends less than 360° around the axis.

19. A restraint system comprising:
a steering-wheel hub;
a steering-wheel handle extending from the steering-wheel hub;
an airbag housing disposed in the steering-wheel hub;
an airbag inflatable from an uninflated position in the airbag housing; and
a plurality of rods hinged to the airbag housing and attached to the airbag;
wherein the airbag is inflatable to an inflated position;
the airbag includes a primary chamber and a plurality of secondary chambers;
the plurality of secondary chambers extend from the steering-wheel hub when the airbag is in the inflated position;
the steering-wheel hub is rotatable and defines an axis of rotation;
the secondary chambers are elongated radially relative to the axis of rotation when the airbag is in the inflated position; and
each rod extends radially relative to the axis of rotation along one of the secondary chambers when the airbag is in the inflated position.

20. A restraint system comprising:
a steering-wheel hub;
a steering-wheel handle extending from the steering-wheel hub;
an airbag housing disposed in the steering-wheel hub;
an airbag inflatable from an uninflated position in the airbag housing; and
a plurality of rods hinged to the airbag housing and attached to the airbag;
wherein the airbag includes a plurality of pockets; and
each pocket houses one of the rods.

21. A restraint system comprising:
a steering-wheel hub;
a steering-wheel handle extending from the steering-wheel hub;
an airbag housing disposed in the steering-wheel hub;
an airbag inflatable from an uninflated position in the airbag housing;
a plurality of rods hinged to the airbag housing and attached to the airbag; and
a plurality of strips attached to the airbag;
wherein each strip is a bistable spring having a first stable position in which the strip is coiled and a second stable position in which the strip is straight.

\* \* \* \* \*